(12) United States Patent
Smith et al.

(10) Patent No.: US 7,220,341 B2
(45) Date of Patent: May 22, 2007

(54) CONTROLLING SOLIDS FLOW IN A GAS-SOLIDS REACTOR

(75) Inventors: Jeffrey S. Smith, Seabrook, TX (US); James Richardson Lattner, Seabrook, TX (US); Kenneth R. Clem, Humble, TX (US); Pete N. Loezos, Houston, TX (US); Nicolas P. Coute, Houston, TX (US); Rutton D. Patel, Arlington, VA (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 511 days.

(21) Appl. No.: 10/313,253

(22) Filed: Dec. 6, 2002

(65) Prior Publication Data

US 2003/0168331 A1    Sep. 11, 2003

Related U.S. Application Data

(60) Provisional application No. 60/363,130, filed on Mar. 11, 2002.

(51) Int. Cl.
*B01J 19/08*    (2006.01)

(52) U.S. Cl. .............. 204/164; 422/190; 422/197; 361/226

(58) Field of Classification Search .............. 204/164; 422/190, 197; 361/226
See application file for complete search history.

(56) References Cited

U.S. PATENT DOCUMENTS

| | | | |
|---|---|---|---|
| 2,525,925 A | 10/1950 | Marshall | 196/52 |
| 3,304,249 A * | 2/1967 | Katz | 204/164 |
| 4,066,526 A * | 1/1978 | Yeh | 204/554 |
| 4,303,961 A | 12/1981 | Frosch et al. | 361/230 |
| 4,532,311 A * | 7/1985 | Fulks et al. | 526/62 |
| 4,779,163 A * | 10/1988 | Bickford et al. | 361/212 |
| 4,803,251 A * | 2/1989 | Goode et al. | 526/59 |
| 5,100,629 A | 3/1992 | Tampa | 422/140 |
| 5,226,928 A | 7/1993 | Makabe et al. | 48/94 |
| 5,251,762 A * | 10/1993 | Taylor et al. | 209/127.4 |
| 5,266,281 A | 11/1993 | Kao et al. | 422/197 |
| 5,409,672 A | 4/1995 | Cetinkaya | 422/189 |
| 5,648,581 A | 7/1997 | Kubo et al. | 585/501 |
| 5,723,041 A | 3/1998 | Devanathan et al. | 208/158 |
| 5,723,094 A | 3/1998 | Sunavala | 422/197 |
| 5,827,485 A | 10/1998 | Libal et al. | 422/179 |
| 5,935,531 A | 8/1999 | Giacobbe | 422/197 |
| 6,200,534 B1 | 3/2001 | Ruottu | 422/145 |

FOREIGN PATENT DOCUMENTS

GB    447159    5/1936

(Continued)

OTHER PUBLICATIONS

Huie Liu, et al, "New Concept Riser-Downer-Coupling Circulating Fluidized Bed and Solids Mixing Behaviour Study", Department of Chemical Engineering, Tsinghua University, Beijing 100084, P.R. China, pp. 83-89, no data available.

(Continued)

*Primary Examiner*—Kishor Mayekar (57) ABSTRACT

This invention is to a process and system for controlling solids distribution in a gas-solids reactor. Solids distribution is controlled by controlling electrical charges between solid particles flowing between conductive surfaces within a gas-solids reactor. The electrical charges are controlled by conventional means such as by grounding the opposing conductive surfaces, or by applying a voltage to one of the opposing conductive surfaces.

16 Claims, 7 Drawing Sheets

FOREIGN PATENT DOCUMENTS

WO    WO 03/078047    9/2003

OTHER PUBLICATIONS

Grace et al, "Circulating Fluidized Beds", Black Academic & Professional, New York, pp. 484-542 (1997).

QI, C. et al. *"Lateral Motion and Its Effect on Particle Concentration Distribution on the Riser of CFB,"* AIChE Symposium Series (1993), No. 296, vol. 89, Fluid-Particle Processes: Fundamentals and Applications (1998), The American Institute of Chemical Engineers, NY, NY 10017, pp. 73-80.

Malcus, S. et al. *"A hydrodynamic model for high and low-density CFB risers,"* Proceedings of the 7th International Conference on Circulating Fluidized Beds, Niagara Falls, Ontario, Canada, May 5-8, 2002, Canadian Society for Chemical Engineering, Ottawa, Canada (2002) pp. 395-402.

\* cited by examiner

CONTROLLING SOLIDS FLOW IN A GAS-SOLIDS REACTOR

This application claims priority to U.S. Ser. No. 60/363,130, filed Mar. 11, 2002, which is fully incorporated herein by reference.

FIELD OF THE INVENTION

This invention relates to processes and systems for controlling solids flow in a gas-solids reactor. More specifically, this invention relates to processes and systems for controlling solid particle flow in a circulating fluidized bed reactor.

BACKGROUND OF THE INVENTION

Chemical reactors can very in design over quite a wide range, depending upon the chemical process in which the reactors are to be used. In certain systems, both reactants and catalyst materials are flowed through the reactor to form the desired chemical products. The products are separated from the catalyst materials, and generally the catalyst materials are regenerated and reused in the reaction process.

U.S. Pat. No. 2,525,925 discloses a fluidized catalytic cracking process in which catalyst particles are flowed with oil feed through a reactor conduit. The resulting products are separated from the catalyst and the catalyst is regenerated through a concentric tube arrangement. Following regeneration, the catalyst is reused to contact additional oil feed.

U.S. Pat. No. 6,200,534 discloses a circulating fluidized bed reactor with a reaction space of an axially annular cross section. The reaction space is surrounded by a second reaction space, which acts as a catalyst regenerator, and which also has an axially annular cross section. The design is considered to make it possible to enable large equipment construction having a small height-to-diameter ratio.

In some cases, conveying particles through tubes such as reaction tubes can cause the particles to become electrically charged. Conveying of charged particles through reactor tubes may be responsible for segregated particle flow, a problem which has been observed in gas-solids or circulating fluidized bed reactors. A problem with segregated flow is that radial distribution of the flowing solid particles can also induce radial non-uniformities in the gas and solid velocity profiles. See, Qi and Farag, "Lateral Motion and Its Effect on Particle Concentration Distribution in the Riser of CFB," AIChE Symposium Series, No. 29, Vol. 89 (1998), p. 73–80, and Malcus and Pugsley, "A hydrodynamic model for high and low-density CFB riser," 6th Int. Conf. Circ. Fluid. Beds (1999) Poster Session. These types of non-uniformities can negatively impact a desirable plug flow pattern of solids through a gas solids or circulating fluidized bed reactor. Accordingly, it would be desirable to control solids flow or provide a gas-solids reactor system which more closely operates at plug flow like characteristics.

SUMMARY OF THE INVENTION

This invention provides a gas-solids reactor system which can operate in a more highly desirable plug flow type of regime compared to existing systems. The invention provides a system in which conductive surfaces of the gas-solids reactor are maintained at an electric potential which substantially reduces the effects of radial electric potential gradient on particles flowing between the conductive surfaces.

In one embodiment, the invention provides a process for controlling flow of solid catalyst particles in a gas-solids reactor. The process comprises flowing solid catalyst particles between opposing conductive surfaces in a gas-solids reactor, and controlling electrical charges between the flowing solid catalyst particles and the opposing conductive surfaces in the gas-solids reactor to move the solid catalyst particles away from at least one of the opposing conductive surfaces.

In another embodiment, the process comprises providing a gas-solids reactor having a wall with an inner surface, at least a portion of the inner surface being made of conducting material, and providing a conductive surface internal to the inner surface of the gas-solids reactor wall. The solid catalyst particles are flowed between the conducting material of the inner surface of the of the gas-solids reactor wall and the conductive surface internal to the inner surface of the gas-solids reactor wall. Electrical charges between the flowing catalyst, the conducting material of the inner surface of the of the gas-solids reactor wall, and the conductive surface internal to the inner surface of the gas-solids reactor wall are controlled to move the solid catalyst particles away from the conducting material of the inner surface of the of the gas-solids reactor wall or the conductive surface internal to the inner surface of the gas-solids reactor wall.

In yet another embodiment, electrical charges are controlled by grounding opposing conductive surfaces. The electrical charges are controlled, in an alternative embodiment, by applying a voltage to one of the opposing conductive surfaces.

In another embodiment of the invention, the voltage applied is at least 10 KV. Preferably, the voltage applied is at least 25 KV. More preferably, the voltage applied is at least 50 KV.

In an alternative embodiment, a gas is flowed with the solid catalyst particles. Preferably, the gas is a chemical reactant. In one embodiment, the chemical reactant is an oxygenate. Preferably, the oxygenate is methanol.

In various embodiments, the solid catalyst particles are selected from the group consisting of molecular sieve catalyst particles, maleic anhydride forming catalyst particles, and acrylonitrile and methacrylonitrile forming catalyst particles. Preferably, the solid catalyst particles are molecular sieve catalyst particles. One example of molecular sieve catalyst particles are silicoaluminophosphate molecular sieve catalyst particles.

In one embodiment of the invention, the catalyst particles and gas are flowed at a weight hourly space velocity of 2 $hr^{-1}$ to 5000 $hr^{-1}$. In a particular embodiment, the catalyst particles and gas are flowed at a gas superficial velocity of at least 2 meters per second. Optionally, the catalyst particles and gas are flowed at a catalyst to gas mass ratio of from 5:1 to 75:1.

In yet another embodiment of the invention, there is provided a gas-solids reactor system for controlling electrical charges between flowing solid particles and conductive surfaces in a gas-solids reactor. The system comprises a gas-solids reactor having a wall with an inner surface, at least a portion of the inner surface being made of conducting material. Further included in the system is a conductive surface internal to the inner surface of the gas-solids reactor wall; and an electric potential inducer in connection with the conductive surface portion of the gas-solids reactor wall and the conductive surface internal to the inner surface of the gas-solids reactor wall. The inducer controls electrical charges between solids flowing through the reactor, the conducting material of the inner surface of the gas-solids reactor wall, and the conductive surface internal to the inner surface of the gas-solids reactor wall.

In one embodiment, the electric potential inducer is a ground connected to each of the conductive surfaces. In another embodiment, the ground is a common ground connected to each of the conductive surfaces. In still another embodiment, the electric potential inducer supplies electric current to the conducting material of the inner surface of the gas-solids reactor wall or the conductive surface internal to the inner surface of the gas-solids reactor wall.

BRIEF DESCRIPTION OF THE DRAWINGS

Examples of various embodiments of this invention are shown in the attached Figures, wherein.

DETAILED DESCRIPTION OF THE INVENTION

I. Controlling Solids Flow and Distribution

This invention provides a process and system for controlling flow of solids particles in a gas-solids reactor system. Controlling flow of solids particles in a gas-solids reactor according to this invention is accomplished in a way so as to control the distribution of the solid particles flowing through a reactor portion of the reaction system. This is desirable, for example, in gas-solids reactors that operate in a fast flow fluidized bed type of regime where feed and solid catalyst particles are flowing in the same direction. By controlling the flow of solid particles, a high degree of plug flow like characteristics can be achieved. This type of flow enables a higher degree of selectivity to a desired end product. For example, in a catalytic reaction system, achieving plug flow like characteristics will result in less undesirable side reactions, and fewer undesirable by-products.

II. Controlling Solids Distribution by Controlling Electrical Charges

In one embodiment of the invention, solids distribution is controlled by controlling electrical charges between solid particles flowing between conductive surfaces within a gas-solids reactor. According to the invention, a gas-solids reactor is one in which a gas is contacted with flowing solids particles to yield a product. The invention is operated such that electrical attraction between the flowing solids and conductive surfaces within the reactor are substantially reduced or eliminated. With no substantial electrical attractive forces between flowing solids and the opposing conductive surfaces of the reactor, a better approach to plug flow like characteristics can be achieved. This means that better selectivity to desired end product can be achieved.

In one aspect of the invention, opposing inner conductive surfaces of a gas-solids reactor are maintained at electric potentials so as to provide increased plug flow like characteristics of solids flowing through the reactor. Increased plug flow like characteristics are accomplished by maintaining the opposing conductive surfaces at an electric potential which substantially reduces electric potential gradient in the radial direction on the solids flowing through the system.

Reducing electric potential gradient in the radial direction results in an increase in plug flow like characteristics of solid particles flowing through the reactor. One way of determining plug flow like characteristics is by measuring the density of catalyst particles across a cross sectional area between the conductive surfaces internal to the reactor. The more uniform the density of the catalyst particles across the cross sectional area, the greater the plug flow like characteristics of the flowing particles.

In one embodiment of the invention, greater plug flow like characteristics are achieved by flowing solid catalyst particles between opposing conductive surfaces in a gas-solids reactor, and controlling electrical charges between the flowing solid catalyst particles and the opposing conductive surfaces. The electrical charges between the solid catalyst particles and the opposing conductive electrical surfaces are controlled such that the solid catalyst particles are moved or forced away from at least one of the opposing conductive surfaces.

Any conventional means can be used to control the electrical charges between the solid catalyst particles and the opposing conductive surfaces of the gas-solids reactor. For example, the opposing conductive surfaces can be ground, either separately or commonly, or one or both opposing conductive surfaces can have a voltage applied thereto. In one embodiment, the opposing conductive surfaces are ground using a conventional grounding strap. Grounding provides a simple way of maintaining opposing conductive surfaces at substantially the same electric potentials.

Desirably, the electric potential of at least one of the inner conductive surfaces of a gas-solids reactor is controlled so that plug flow like characteristics are substantially increased. An example of this type of system includes a gas-solids reactor having a wall with an inner surface. At least a portion of the inner surface is made of conducting material. Any conventional conductive material suitable for use in a reactor system can be used. Internal to the inner surface of the gas-solids reactor wall is located a conductive surface. Such a conductive surface can be a rod or pipe or any type of surface that is conductive and will not substantially impede flow of solid particles between the conductive surface and the conductive surface of the inner wall.

In operation, voltage between the conductive surfaces is controlled to affect radial electric potential gradient on the solid particles flowing between the conductive surfaces. The voltage can be controlled by grounding the opposing surfaces or by applying an appropriate electric charge to at least one of the opposing surfaces.

In one embodiment, the voltage applied to one conductive surface is not greater than about ten times that of the opposing conductive surface. Preferably the voltage is not greater than about five times that of the opposing conductive surface, more preferably not greater than about two times that of the opposing conductive surface, and most preferably not greater than 1.5 times that of the opposing conductive surface.

In another embodiment of the invention, the opposing inner conductive surfaces are maintained at substantially the same voltage. In this embodiment, the voltages of each surface are within about 25% of one another, preferably within about 15% of one another, and most preferably within about 10% of that of one another.

In another embodiment of the invention, a voltage is applied to at least one of the opposing conductive surfaces, across which the flowing solid particles pass. A voltage effective for moving the solid particles away from the conductive surface is applied. In one aspect, a voltage of at least 10 KV is applied to one of the conductive surfaces. Preferably a voltage of at least 25 KV is applied, and more preferably a voltage of at least 50 KV is applied.

The electric potential of at least one of the conductive surfaces within the reactor of a gas-solids reactor system can be controlled by using an electric potential inducer. The electric potential inducer can be used to maintain opposing conductive surfaces at substantially the same electric potentials or to maintain a desired differential potential between opposing conductive surfaces. Such an inducer is connected to one or more opposing reactor walls or conductive surfaces within the walls.

In one embodiment of the invention, an electric potential inducer is connected to the conductive surface portion of the gas-solids reactor wall and the conductive surface internal to the inner surface of the gas-solids reactor wall. The inducer controls electrical charges between solids flowing through the reactor, the conducting material of the inner surface of the gas-solids reactor wall, and the conductive surface internal to the inner surface of the gas-solids reactor wall.

The electric potential inducer can be any conventional device capable of controlling electrical charges. For example, the electric potential inducer can be a ground connected to one or more of the conductive surfaces; a common ground connected to each of the conductive surfaces; or a device that supplies electric current to the conducting material of the inner surface of the gas-solids reactor wall or the conductive surface internal to the inner surface of the gas-solids reactor wall.

In yet another embodiment of the invention, the opposing conductive surfaces are held at different voltages. This can be accomplished by conventional means in which electric current is applied to at least one of the opposing conductive surfaces as desired. This embodiment is particularly advantageous in situations where there is a substantial imbalance of electric potentials across opposing conductive surfaces. In this embodiment, appropriate charges can be applied as necessary to reduce the volume fraction of catalyst particles at any given point of concern.

The gas-solids reactor of the invention is one in which the total electric field potential between at least two opposing conductive surfaces is reduced by at least about 10%. Preferably, the gas-solids reactor reduces the total electric field by at least about 25%, and more preferably by at least about 50%.

III. Description of Solid Particles

The solids that flow through the gas-solids reactor system of this invention are compounds that are solid at the conventional operating conditions of the reactor. The solids can be inert materials, catalytic materials, or a mixture thereof. Preferably, the solids are catalyst particles. As a non-limiting example, the solid catalyst particles are selected from the group consisting of molecular sieve catalyst particles, maleic anhydride forming catalyst particles, and acrylonitrile and methacrylonitrile forming catalyst particles.

In one embodiment, the catalyst particles which are flowed through the gas-solids reactor system of this invention are molecular sieve catalysts. Any conventional molecular sieve can be used. Examples include zeolite as well as non-zeolite molecular sieves, and are of the large, medium or small pore type. Non-limiting examples of these molecular sieves are the small pore molecular sieves, AEI, AFT, APC, ATN, ATT, ATV, AWW, BIK, CAS, CHA, CHI, DAC, DDR, EDI, ERI, GOO, KFI, LEV, LOV, LTA, MON, PAU, PHI, RHO, ROG, THO, and substituted forms thereof; the medium pore molecular sieves, AFO, AEL, EUO, HEU, FER, MEL, MFI, MTW, MTT, TON, and substituted forms thereof; and the large pore molecular sieves, EMT, FAU, and substituted forms thereof. Other molecular sieves include ANA, BEA, CFI, CLO, DON, GIS, LTL, MER, MOR, MWW and SOD. Non-limiting examples of the preferred molecular sieves, particularly for converting an oxygenate containing feedstock into olefin(s), include AEL, AFY, BEA, CHA, EDI, FAU, FER, GIS, LTA, LTL, MER, MFI, MOR, MTT, MWW, TAM and TON. In one preferred embodiment, the molecular sieve of the invention has an AEI topology or a CHA topology, or a combination thereof, most preferably a CHA topology.

Molecular sieve materials all have 3-dimensional, four-connected framework structure of corner-sharing $TO_4$ tetrahedra, where T is any tetrahedrally coordinated cation. These molecular sieves are typically described in terms of the size of the ring that defines a pore, where the size is based on the number of T atoms in the ring. Other framework-type characteristics include the arrangement of rings that form a cage, and when present, the dimension of channels, and the spaces between the cages. See van Bekkum, et al., *Introduction to Zeolite Science and Practice, Second Completely Revised and Expanded Edition*, Volume 137, pages 1–67, Elsevier Science, B. V., Amsterdam, Netherlands (2001).

The small, medium and large pore molecular sieves have from a 4-ring to a 12-ring or greater framework-type. In a preferred embodiment, the molecular sieves have 8-, 10- or 12-ring structures or larger and an average pore size in the range of from about 3 Å to 15 Å. In the most preferred embodiment, the molecular sieves of the invention, preferably silicoaluminophosphate molecular sieves, have 8-rings and an average pore size less than about 5 Å, preferably in the range of from 3 Å to about 5 Å, more preferably from 3 Å to about 4.5 Å, and most preferably from 3.5 Å to about 4.2 Å.

Molecular sieves, particularly zeolitic and zeolitic-type molecular sieves, preferably have a molecular framework of one, preferably two or more corner-sharing $[TO_4]$ tetrahedral units, more preferably, two or more $[SiO_4]$, $[AlO_4]$ and/or $[PO_4]$ tetrahedral units, and most preferably $[SiO_4]$, $[AlO_4]$ and $[PO_4]$ tetrahedral units. These silicon, aluminum, and phosphorous based molecular sieves and metal containing silicon, aluminum and phosphorous based molecular sieves have been described in detail in numerous publications including for example, U.S. Pat. No. 4,567,029 (MeAPO where Me is Mg, Mn, Zn, or Co), U.S. Pat. No. 4,440,871 (SAPO), European Patent Application EP-A-0 159 624 (ELAPSO where El is As, Be, B, Cr, Co, Ga, Ge, Fe, Li, Mg, Mn, Ti or Zn), U.S. Pat. No. 4,554,143 (FeAPO), U.S. Pat. Nos. 4,822,478, 4,683,217, 4,744,885 (FeAPSO), EP-A-0 158 975 and U.S. Pat. No. 4,935,216 (ZnAPSO, EP-A-0 161 489 (CoAPSO), EP-A-0 158 976 (ELAPO, where EL is Co, Fe, Mg, Mn, Ti or Zn), U.S. Pat. No. 4,310,440 (AlPO$_4$), EP-A-0 158 350 (SENAPSO), U.S. Pat. No. 4,973,460 (LiAPSO), U.S. Pat. No. 4,789,535 (LiAPO), U.S. Pat. No. 4,992,250 (GeAPSO), U.S. Pat. No. 4,888,167 (GeAPO), U.S. Pat. No. 5,057,295 (BAPSO), U.S. Pat. No. 4,738,837 (CrAPSO), U.S. Pat. Nos. 4,759,919, and 4,851,106 (CrAPO), U.S. Pat. Nos. 4,758,419, 4,882,038, 5,434,326 and 5,478,787 (MgAPSO), U.S. Pat. No. 4,554,143 (FeAPO), U.S. Pat. No. 4,894,213 (AsAPSO), U.S. Pat. No. 4,913,888 (AsAPO), U.S. Pat. Nos. 4,686,092, 4,846,956 and 4,793,833 (MnAPSO), U.S. Pat. Nos. 5,345,011 and 6,156,931 (MnAPO), U.S. Pat. No. 4,737,353 (BeAPSO), U.S. Pat. No. 4,940,570 (BeAPO), U.S. Pat. Nos. 4,801,309, 4,684,617 and 4,880,520 (TiAPSO), U.S. Pat. Nos. 4,500,651, 4,551,236 and 4,605,492 (TiAPO), U.S. Pat. Nos. 4,824,554, 4,744,970 (CoAPSO), U.S. Pat. No. 4,735,806 (GaAPSO) EP-A-0 293 937 (QAPSO, where Q is framework oxide unit [QO$_2$]), as well as U.S. Pat. Nos. 4,567,029, 4,686,093, 4,781,814, 4,793,984, 4,801,364, 4,853,197, 4,917,876, 4,952,384, 4,956,164, 4,956,165, 4,973,785, 5,241,093, 5,493,066 and 5,675,050, all of which are herein fully incorporated by reference.

Other molecular sieves include those described in EP-0 888 187 B1 (microporous crystalline metallophosphates, SAPO$_4$ (UIO-6)), U.S. Pat. No. 6,004,898 (molecular sieve and an alkaline earth metal), U.S. Pat. No. 6,743,747 (integrated hydrocarbon co-catalyst), PCT WO 01/64340 published Sep. 7, 2001 (thorium containing molecular sieve), and R. Szostak, *Handbook of Molecular Sieves*, Van Nostrand Reinhold, New York, N.Y. (1992), which are all herein fully incorporated by reference.

The more preferred silicon, aluminum and/or phosphorous containing molecular sieves, and aluminum, phosphorous, and optionally silicon, containing molecular sieves include aluminophosphate (ALPO) molecular sieves and silicoaluminophosphate (SAPO) molecular sieves and substituted, preferably metal substituted, ALPO and SAPO molecular sieves. The most preferred molecular sieves are SAPO molecular sieves, and metal substituted SAPO molecular sieves. In an embodiment, the metal is an alkali metal of Group IA of the Periodic Table of Elements, an alkaline earth metal of Group IIA of the Periodic Table of Elements, a rare earth metal of Group IIIB, including the Lanthanides: lanthanum, cerium, praseodymium, neodymium, samarium, europium, gadolinium, terbium, dysprosium, holmium, erbium, thulium, ytterbium and lutetium; and scandium or yttrium of the Periodic Table of Elements, a transition metal of Groups IVB, VB, VIB, VIIB, VIIIB, and IB of the Periodic Table of Elements, or mixtures of any of these metal species. In one preferred embodiment, the metal is selected from the group consisting of Co, Cr, Cu, Fe, Ga, Ge, Mg, Mn, Ni, Sn, Ti, Zn and Zr, and mixtures thereof. In another preferred embodiment, these metal atoms discussed above are inserted into the framework of a molecular sieve through a tetrahedral unit, such as [MeO$_2$], and carry a net charge depending on the valence state of the metal substituent. For example, in one embodiment, when the metal substituent has a valence state of +2, +3, +4, +5, or +6, net charge of the tetrahedral unit is between −2 and +2.

In one embodiment, the molecular sieve, as described in many of the U.S. patents mentioned above, is represented by the empirical formula, on an anhydrous basis:

mR:(M$_x$Al$_y$P$_z$)O$_2$ wherein R represents at least one templating agent, preferably an organic templating agent; m is the number of moles of R per mole of (M$_x$Al$_y$P$_z$)O$_2$ and m has a value from 0 to 1, preferably 0 to 0.5, and most preferably from 0 to 0.3; x, y, and z represent the mole fraction of Al, P and M as tetrahedral oxides, where M is a metal selected from one of Group IA, IIA, IB, IIIB, IVB, VB, VIB, VIIB, VIIIB and Lanthanide's of the Periodic Table of Elements, preferably M is selected from one of the group consisting of Co, Cr, Cu, Fe, Ga, Ge, Mg, Mn, Ni, Sn, Ti, Zn and Zr. In an embodiment, m is greater than or equal to 0.2, and x, y and z are greater than or equal to 0.01.

In another embodiment, m is greater than 0.1 to about 1, x is greater than 0 to about 0.25, y is in the range of from 0.4 to 0.5, and z is in the range of from 0.25 to 0.5, more preferably m is from 0.15 to 0.7, x is from 0.01 to 0.2, y is from 0.4 to 0.5, and z is from 0.3 to 0.5.

Non-limiting examples of SAPO and ALPO molecular sieves used in the invention include one or a combination of SAPO-5, SAPO-8, SAPO-11, SAPO-16, SAPO-17, SAPO-18, SAPO-20, SAPO-31, SAPO-34, SAPO-35, SAPO-36, SAPO-37, SAPO-40, SAPO-41, SAPO-42, SAPO-44 (U.S. Pat. No. 6,162,415), SAPO-47, SAPO-56, ALPO-5, ALPO-11, ALPO-18, ALPO-31, ALPO-34, ALPO-36, ALPO-37, ALPO-46, and metal containing molecular sieves thereof. The more preferred zeolite-type molecular sieves include one or a combination of SAPO-18, SAPO-34, SAPO-35, SAPO-44, SAPO-56, ALPO-18 and ALPO-34, even more preferably one or a combination of SAPO- 18, SAPO-34, ALPO-34 and ALPO-18, and metal containing molecular sieves thereof, and most preferably one or a combination of SAPO-34 and ALPO-18, and metal containing molecular sieves thereof.

In an embodiment, the molecular sieve is an intergrowth material having two or more distinct phases of crystalline structures within one molecular sieve composition. In particular, intergrowth molecular sieves are described in the U.S. Pat. No. 6,812,372 and PCT WO 98/15496 published Apr. 16, 1998, both of which are herein fully incorporated by reference. In another embodiment, the molecular sieve comprises at least one intergrown phase of AEI and CHA framework-types. For example, SAPO-18, ALPO-18 and RUW-18 have an AEI framework-type, and SAPO-34 has a CHA framework-type.

In one embodiment, the molecular sieves used in the invention are combined with one or more other molecular sieves. In another embodiment, the preferred silicoaluminophosphate or aluminophosphate molecular sieves, or a combination thereof, are combined with one more of the following non-limiting examples of molecular sieves described in the following: Beta (U.S. Pat. No. 3,308,069), ZSM-5 (U.S. Pat. Nos. 3,702,886, 4,797,267 and 5,783,321), ZSM-11 (U.S. Pat. No. 3,709,979), ZSM-12 (U.S. Pat. No. 3,832,449), ZSM-12 and ZSM-38 (U.S. Pat. No. 3,948,758), ZSM-22 (U.S. Pat. No. 5,336,478), ZSM-23 (U.S. Pat. No. 4,076,842), ZSM-34 (U.S. Pat. No. 4,086,186), ZSM-35 (U.S. Pat. No. 4,016,245, ZSM-48 (U.S. Pat. No. 4,397,827), ZSM-58 (U.S. Pat. No. 4,698,217), MCM-1 (U.S. Pat. No. 4,639,358), MCM-2 (U.S. Pat. No. 4,673,559), MCM-3 (U.S. Pat. No. 4,632,811), MCM-4 (U.S. Pat. No. 4,664,897), MCM-5 (U.S. Pat. No. 4,639,357), MCM-9 (U.S. Pat. No. 4,880,611), MCM-10 (U.S. Pat. No. 4,623,527), MCM-14 (U.S. Pat. No. 4,619,818), MCM-22 (U.S. Pat. No. 4,954,325), MCM-41 (U.S. Pat. No. 5,098,684), M-41S (U.S. Pat. No. 5,102,643), MCM-48 (U.S. Pat. No. 5,198,203), MCM-49 (U.S. Pat. No. 5,236,575), MCM-56 (U.S. Pat. No. 5,362,697), ALPO-11 (U.S. Pat. No. 4,310,440), titanium aluminosilicates (TASO), TASO-45 (EP-A-0 229,-295), boron silicates (U.S. Pat. No. 4,254,297), titanium aluminophosphates (TAPO) (U.S. Pat. No. 4,500,651), mixtures of ZSM-5 and ZSM-11 (U.S. Pat. No. 4,229,424), ECR-18 (U.S. Pat. No. 5,278,345), SAPO-34 bound ALPO-5 (U.S. Pat. No. 5,972,203), PCT WO 98/57743 published Dec. 23, 1988 (molecular sieve and Fischer-Tropsch), U.S. Pat. No. 6,300,535 (MFI-bound zeolites), and mesoporous molecular sieves (U.S. Pat. Nos. 6,284,696, 5,098,684, 5,102,643 and 5,108,725), which are all herein fully incorporated by reference.

The molecular sieves are made or formulated into catalysts by combining the synthesized molecular sieves with a binder and/or a matrix material to form a molecular sieve catalyst composition or a formulated molecular sieve catalyst composition. This formulated molecularsieve catalyst composition is formed into useful shape and sized particles by conventional techniques such as spray drying, pelletizing, extrusion, and the like.

There are many different binders that are useful in forming the molecular sieve catalyst composition. Non-limiting examples of binders that are useful alone or in combination include various types of hydrated alumina, silicas, and/or other inorganic oxide sol. One preferred alumina containing sol is aluminum chlorhydrol. The inorganic oxide sol acts like glue binding the synthesized molecular sieves and other materials such as the matrix together, particularly after thermal treatment. Upon heating, the inorganic oxide sol, preferably having a low viscosity, is converted into an inorganic oxide matrix component. For example, an alumina sol will convert to an aluminum oxide matrix following heat treatment.

Aluminum chlorhydrol, a hydroxylated aluminum based sol containing a chloride counter ion, has the general formula of $Al_mO_n(OH)_oCl_p \cdot x(H_2O)$ wherein m is 1 to 20, n is 1 to 8, o is 5 to 40, p is 2 to 15, and x is 0 to 30. In one embodiment, the binder is $Al_{13}O_4(OH)_{24}Cl_7 \cdot 12(H_2O)$ as is described in G. M. Wolterman, et al., Stud. Surf. Sci. and Catal., 76, pages 105–144 (1993), which is herein incorporated by reference. In another embodiment, one or more binders are combined with one or more other non-limiting examples of alumina materials such as aluminum oxyhydroxide, γ-alumina, boehmite, diaspore, and transitional aluminas such as α-alumina, β-alumina, γ-alumina, δ-alumina, ε-alumina, κ-alumina, and ρ-alumina, aluminum trihydroxide, such as gibbsite, bayerite, nordstrandite, doyelite, and mixtures thereof.

In another embodiment, the binders are alumina sols, predominantly comprising aluminum oxide, optionally including some silicon. In yet another embodiment, the binders are peptized alumina made by treating alumina hydrates such as pseudobohemite, with an acid, preferably an acid that does not contain a halogen, to prepare sols or aluminum ion solutions. Non-limiting examples of commercially available colloidal alumina sols include Nalco 8676 available from Nalco Chemical Co., Naperville, Ill., and Nyacol available from The PQ Corporation, Valley Forge, Pa.

The molecular sieve, in a preferred embodiment, is combined with one or more matrix material(s). Matrix materials are typically effective in reducing overall catalyst cost, act as thermal sinks assisting in shielding heat from the catalyst composition for example during regeneration, densifying the catalyst composition, increasing catalyst strength such as crush strength and attrition resistance, and to control the rate of conversion in a particular process.

Non-limiting examples of matrix materials include one or more of: rare earth metals, metal oxides including titania, zirconia, magnesia, thoria, beryllia, quartz, silica or sols, and mixtures thereof, for example silica-magnesia, silica-zirconia, silica-titania, silica-alumina and silica-alumina-thoria. In an embodiment, matrix materials are natural clays such as those from the families of montmorillonite and kaolin. These natural clays include sabbentonites and those kaolins known as, for example, Dixie, McNamee, Georgia and Florida clays. Non-limiting examples of other matrix materials include: haloysite, kaolinite, dickite, nacrite, or anauxite. In one embodiment, the matrix material, preferably any of the clays, are subjected to well known modification processes such as calcination and/or acid treatment and/or chemical treatment.

In one preferred embodiment, the matrix material is a clay or a clay-type composition, preferably the clay or clay-type composition having a low iron or titania content, and most preferably the matrix material is kaolin. Kaolin has been found to form a pumpable, high solid content slurry, it has a low fresh surface area, and it packs together easily due to its platelet structure. A preferred average particle size of the matrix material, most preferably kaolin, is from about 0.1 μm to about 0.6 μm with a D90 particle size distribution of less than about 1 μm.

In another embodiment, the weight ratio of the binder to the matrix material used in the formation of the molecular sieve catalyst composition is from 0:1 to 1:15, preferably 1:15 to 1:5, more preferably 1:10 to 1:4, and most preferably 1:6 to 1:5. It has been found that a higher sieve content, lower matrix content, increases the molecular sieve catalyst composition performance, however, lower sieve content, higher matrix material, improves the attrition resistance of the composition.

In another embodiment, the formulated molecular sieve catalyst composition contains from about 1% to about 99%, more preferably from about 5% to about 90%, and most preferably from about 10% to about 80%, by weight of the molecular sieve based on the total weight of the molecular sieve catalyst composition.

In another embodiment, the weight percent of binder in or on the spray dried molecular sieve catalyst composition based on the total weight of the binder, molecular sieve, and matrix material is from about 2% by weight to about 30% by weight, preferably from about 5% by weight to about 20% by weight, and more preferably from about 7% by weight to about 15% by weight.

Once the molecular sieve catalyst composition is formed in a substantially dry or dried state, to further harden and/or activate the formed catalyst composition, a heat treatment such as calcination, at an elevated temperature is usually performed. A conventional calcination environment is air that typically includes a small amount of water vapor. Typical calcination temperatures are in the range from about 400° C. to about 1,000° C. preferably from about 500° C. to about 800° C., and most preferably from about 550° C. to about 700° C., preferably in a calcination environment such as air, nitrogen, helium, flue gas (combustion product lean in oxygen), or any combination thereof.

The catalyst particles used according to this invention can also be maleic anhydride forming catalysts. In one embodiment, the maleic anhydride forming catalyst comprise a mixed oxide containing vanadium and phosphorus as major constituent elements (vanadium-phosphorus mixed oxide). Examples of such catalysts include those comprising divanadyl pyrophosphate $((VO)_2P_2O_7)$ as the active component.

Details of these catalysts including production processes are disclosed, for example, in *Chem. Rev.*, 88, pp. 55–80 (1988), JP-B-4-24104, and U.S. Pat. Nos. 4,472,527 and 4,520,127, the descriptions of which are incorporated herein by reference.

In another embodiment of this invention, acrylonitrile and methacrylonitrile forming catalysts can be used. Such catalysts produce acrylonitrile and/or methacrylonitrile by ammoxidation of propylene, isobutene or tert-butanol; that is by reacting propylene with isobutene or tert-butanol, an oxygen-containing gas, and ammonia. Such catalysts include an oxide catalyst containing molybdenum, bismuth and iron. See, for example, U.S. Pat. No. 3,226,422, the description of which is incorporated herein by reference. Another example is an oxide catalyst containing antimony and iron. See, for example, examined Japanese Patent Application Publication No. 38-19111, the description of which is incorporated herein by reference.

Other acrylonitrile and methacrylonitrile forming catalysts which can be used in the reactor system of this invention include catalysts containing an alkali metal and thallium in addition to molybdenum, bismuth and cerium. See, for example, British Patent No. 1,445,512 and U.S. Pat. No. 4,746,753. the descriptions of each being incorporated herein by reference. Also included are catalysts comprising molybdenum, tungsten, bismuth and cerium, as described in examined Japanese Patent Application Publication No. 61-43094; an oxide catalyst containing at least one element selected from iron, chromium, aluminum and bismuth, in addition to molybdenum, tellurium and cerium, as described in U.S. Pat. No. 4,969,390; an oxide catalyst containing, in addition to molybdenum, bismuth and iron, at least one element selected from nickel and cobalt and at least one element selected from an alkali metal, a rare earth element, tantalum and niobium as described in U.S. Pat. No. 4,192,776; an oxide catalyst containing molybdenum, bismuth and iron as essential elements, and also containing at least one element selected from cerium, lanthanum, neodymium, praseodymium, samarium, europium and gadolinium, and at least one element selected from potassium, rubidium and cesium, as described in U.S. Pat. No. 4,443,556; a catalyst containing, in addition to molybdenum, bismuth, phosphorus and silicon, at least two elements selected from iron, cobalt, nickel, copper, zirconium and potassium, and at least one element selected from manganese, cerium, thorium, yttrium, lanthanum and thallium, as described in unexamined Japanese Patent Application Laid-Open Specification No. 59-204163; and a catalyst containing molybdenum, bismuth, iron, nickel, magnesium, potassium and cesium as essential elements and optionally containing cobalt, manganese, chromium, phosphorus, antimony, tellurium, sodium, cerium and/or tungsten, as described in U.S. Pat. No. 5,093,299, U.S. Pat. No. 5,175,334 and U.S. Pat. No. 5,212,137.

Yet another ammoxidation or acrylonitrile and/or methacrylonitrile forming catalyst composition useful in this invention comprises an oxide catalyst composition represented by the formula (I):

$$Mo_{12}(Bi_{1-a}A_a)_b Fe_c Ni_d X_e Y_f O_g \quad (I)$$

wherein:
A is at least one rare earth element,
X is at least one element selected from magnesium and zinc,
Y is at least one element selected from potassium, rubidium and cesium,
a is the atomic ratio of A to the sum of bismuth and A,
b is the atomic ratio of the sum of bismuth and A, relative to twelve atoms of molybdenum, and
c, d, e, f and g are, respectively, the atomic ratios of iron, nickel, X, Y and oxygen, relative to twelve atoms of molybdenum,
wherein
a is a number of from 0.6 to 0.8,
b is a number of from 0.5 to 2,
c is a number of from 0.1 to 3,
d is a number of from 4 to 10,
e is a number of from 0 to 3,
f is a number of from 0.01 to 2, and
g is a number determined by the valence requirements of the other elements present. This catalyst is further described in U.S. Pat. No. 5,658,842, which is incorporated herein by reference.

Inert solid particles can be flowed through the reactor system of this invention. The inert solid particles can be mixed with solid catalyst particles or used as carrier materials for any conventional catalyst. Examples of such inert solid materials include oxides, such as silica, alumina, titania and zirconia. Of these oxides, silica is preferred. Silica is inherently inert, differing from other solid materials, and can serve as an excellent binder for the ingredients of the oxide catalyst composition without impairing the selectivity of many catalyst compositions. Such material also serves to impart the resulting catalyst composition with a high attrition resistance. When used as carrier, the silica can be in the range of about 30% to about 70% by weight, preferably about 40% to about 60% by weight, based on the total weight of the catalyst composition and the carrier.

IV. Gas Flow

In the gas-solids reactor system of this invention, gas is flowed along with the solids. The gas can be inert or a chemical reactant. In a preferred embodiment of the invention, the gas flowing through the gas-solids reactor system is a chemical reactant and the solids are catalyst particles capable of transforming the reactant into a product.

In one embodiment, the chemical reactant is an oxygenate and the catalyst particles are molecular sieves. Molecular sieves capable of converting the oxygenate to olefins are preferred. Any of the above described molecular sieves can be used. Conventional zeolites and silicoaluminophosphates are preferred.

Oxygenates used in this invention include one or more organic compound(s) containing at least one oxygen atom. In the most preferred embodiment of the process of invention, the oxygenate in the feedstock is one or more alcohol(s), preferably aliphatic alcohol(s) where the aliphatic moiety of the alcohol(s) has from 1 to 20 carbon atoms, preferably from 1 to 10 carbon atoms, and most preferably from 1 to 4 carbon atoms. The alcohols useful as feedstock in the process of the invention include lower straight and branched chain aliphatic alcohols and their unsaturated counterparts. Non-limiting examples of oxygenates include methanol, ethanol, n-propanol, isopropanol, methyl ethyl ether, dimethyl ether, diethyl ether, di-isopropyl ether, formaldehyde, dimethyl carbonate, dimethyl ketone, acetic acid, and mixtures thereof. In the most preferred embodiment, the feedstock is selected from one or more of methanol, ethanol, dimethyl ether, diethyl ether or a combination thereof, more preferably methanol and dimethyl ether, and most preferably methanol.

The feedstock, in one embodiment, contains one or more diluent(s), typically used to reduce the concentration of the feedstock, and are generally non-reactive to the feedstock or molecular sieve catalyst composition. Non-limiting examples of diluents include helium, argon, nitrogen, carbon monoxide, carbon dioxide, water, essentially non-reactive paraffins (especially alkanes such as methane, ethane, and propane), essentially non-reactive aromatic compounds, and mixtures thereof. The most preferred diluents are water and nitrogen, with water being particularly preferred.

The diluent is either added directly to a feedstock entering into a reactor or added directly into a reactor, or added with a molecular sieve catalyst composition. In one embodiment, the amount of diluent in the feedstock is in the range of from about 1 to about 99 mole percent based on the total number of moles of the feedstock and diluent, preferably from about 1 to 80 mole percent, more preferably from about 5 to about 50, most preferably from about 5 to about 25. In another embodiment, other hydrocarbons are added to a feedstock either directly or indirectly, and include olefin(s), paraffin(s), aromatic(s) (see for example U.S. Pat. No. 4,677,242, addition of aromatics) or mixtures thereof, preferably propylene, butylene, pentylene, and other hydrocarbons having 4 or more carbon atoms, or mixtures thereof.

In yet another embodiment of the invention, the solid particles flowed through the reactor system of this invention are catalyst particles used to make maleic anhydride, and the gas is a hydrocarbon in the vapor state that is used to make maleic hydride. Feedstock used to make maleic anhydride according to this invention include straight chain hydrocarbons having 4 carbon atoms. Examples of these hydrocarbons include butane (n-butane), butenes (1-butene and 2-butene), and butadiene (1,3-butadiene). Preferred among these is butane. Such compounds are generally contacted with an oxygen containing gas such as air. However, air diluted with an inert gas, or air enriched with oxygen, can also be used.

In another embodiment of the invention, the solid particles flowed through the reactor system of this invention are catalyst particles used to make acrylonitrile and/or methacrylonitrile, and the gas is a hydrocarbon in the vapor state that is used to make acrylonitrile and/or methacrylonitrile.

Feedstock used to make acrylonitrile and/or methacrylonitrile according to this invention include propylene, isobutene or tert-butanol. Such feedstock is converted to acrylonitrile and/or methacrylonitrile by contacting with an oxygen-containing gas in the presence of ammonia.

V. Flow Parameters

In one embodiment of this invention, the gas and solid particles are flowed through the gas-solids reactor system at a weight hourly space velocity (WHSV) of from about 1 $hr^{-1}$ to about 5,000 $hr^{-1}$, preferably from about 5 $hr^{-1}$ to about 3,000 $hr^{-1}$, more preferably from about 10 $hr^{-1}$ to about 1,500 $hr^{-1}$, and most preferably from about 20 $hr^{-1}$ to about 1,000 $hr^{-1}$. In one preferred embodiment, the WHSV is greater than 25 $hr^{-1}$, and up to about 500 $hr^{-1}$. In this invention, WHSV is defined as the total weight per hour of the gas flowing between reactor walls divided by the total weight of the solids flowing between the same segment of reactor walls. The WHSV is maintained at a level sufficient to keep the catalyst composition in a fluidized state within a reactor.

In another embodiment of the invention, the gas and solid particles are flowed through the gas-solids reactor system at a gas superficial velocity (GSV) at least 1 meter per second (m/sec), preferably greater than 2 m/sec, more preferably greater than 3 m/sec, and most preferably greater than 4 m/sec. The GSV should be sufficient to maintaining the solids in a fluidized state, particularly in a fast fluidized state.

In yet another embodiment of the invention, the solids particles and gas are flowed through the gas-solids reactor at a solids to gas mass ratio of about 5:1 to about 75:1. Preferably, the solids particles and gas are flowed through the gas-solids reactor at a solids to gas mass ratio of about 8:1 to about 50:1, more preferably from about 10:1 to about 40:1.

V. Examples of Particular Embodiments

Figure 1A:
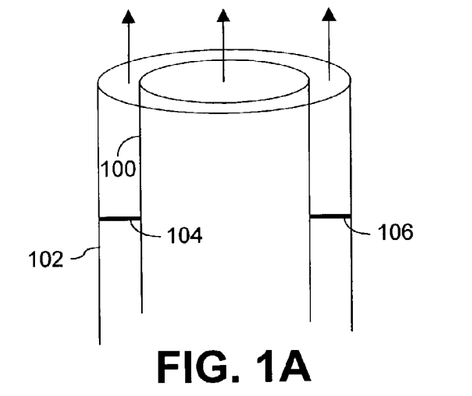
FIGS. 1A–E show various embodiments of the reactor system of the invention in which inner surfaces of reactor walls are maintained at substantially equivalent electric potentials by connecting each surface using grounding straps.

FIGS. 1A–E show different embodiments of the invention. In FIG. 1A, a conduit 100 is shown within a conduit 102. Conduits 100 and 102 are both made of a conductive metal such that the arrangement is one having opposing conductive surfaces. In this embodiment, solids particles flow through both conduits in the direction of the arrows. The inner surfaces of the conduits are ground to one another by grounding straps 104, 106 to maintain substantially equal electric potentials between opposing surfaces. Although the embodiment shows flow through both conduits, either one of the conduits can be closed off if desired. In addition, flow through both conduits can be co-current or counter current to one another.

Figure 1B:
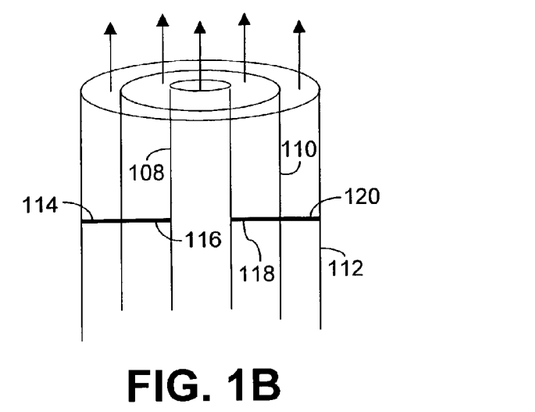

FIG. 1B shows multiple conduits 108, 110 within a conduit 112, each of the conduits being made of conductive material; therefore, each having opposing conductive surfaces. In this embodiment, each of the conductive inner surfaces are grounded by grounding straps 114, 116, 118, 120 to one another as in FIG. 1A. Also as in FIG. 1A, any one of the conduits can be closed off if desired.

Figure 1C:
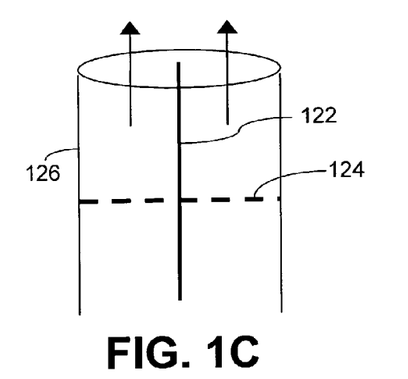

FIG. 1C shows what is the equivalent of FIG. 1A, when the inner conduit in FIG. 1A is closed off. In FIG. 1C, inner conduit 122 is essentially a wire or solid rod secured with a non-conducting strap 124 to secure conduits of different potentials. The wire or solid rod can be manipulated relative to the inner surface of the shown open conduit 126 in order to change electric potential (e.g., voltage) between inner surfaces. This manipulation means that a voltage can be applied to the inner conduit 122 or to the inner surface of conduit 126 in order to change electric potential between surfaces. The voltage supplied will be sufficient to move solid particles away from either inner conduit 122, the inner surface of conduit 126 or both. This will keep the solid particles from collecting at one or both of the surfaces of the conduits (called solids hold up) as the solids are flowed through the conduit.

Figure 1D:
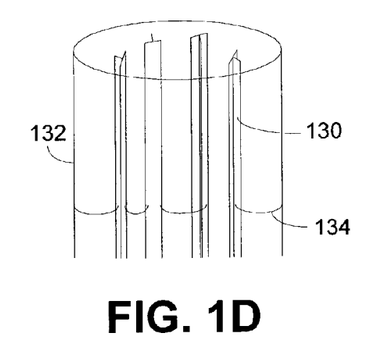

FIG. 1D shows multiple "T" shaped rods 130 within a conduit 132. Each of the T shaped rods 130 are made of conducting material and shown connected by grounding straps 134 and to the wall of the conduit 132, which is also made of a conducting material. Each of the T shaped rods 130 can also be individually charged, if desired, to obtain a desired electrical gradient between the rods and the inner surface of the conduit 132 (not shown).

Figure 1E:
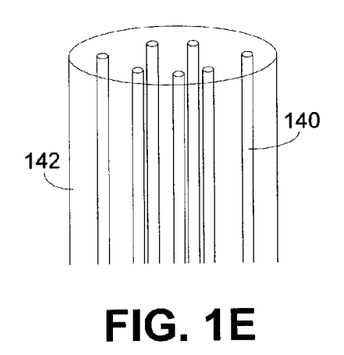

FIG. 1E shows multiple rods 140, each made of conducting material, within a conduit 142, the conduit 142 having an inner surface made of conducting material. The rods 140 can be ground to one another and to the wall of the conduit 142 (not shown), or each can be appropriately charged to obtain a desired electrical distribution between the rods and the inner surface of the conduit 122 (not shown).

FIGS. 1A–E generally show embodiments using a variety of tubes and rods to control the potential difference. Alternatively, any conducting surface may be used for the inner conducting surface or wall, such as a perforated tube or vertical baffles.

This invention will be better understood with reference to the following examples, which are intended to illustrate specific embodiments within the overall scope of the invention as claimed.

EXAMPLE 1

Predictive models of electric potential of solids and velocity distributions of solids flowing through tubular gas-solids reactor systems were established as follows Charged particles set up an electric field, $\vec{E}$, which ultimately generates an electrophoretic flux of particles or coulombic force from the center of the pipe to the wall. The force is balanced with an opposing pressure gradient due to the build up of particles at the wall.

A radial force balance may be written as $$Q\phi \frac{d\psi}{d\xi} + \frac{d\phi}{d\xi} = 0 \qquad (1)$$

where $\psi$ is the non-dimensional radial electric potential distribution, $$\frac{V\varepsilon_o d}{6\sigma R^2};$$

$\phi$ is the radial volume fraction distribution of solid particles; $\xi$ is the radial coordinate, r/R; and Q is the electrodispersion parameter that affects the degree of segregation of particles and the average solids volume fraction in the riser, $$\frac{14400 R^2 \sigma^2}{\varepsilon_o d^2 \rho_s U^2};$$

where R is the radius, m; $\sigma$ is the surface charge density, C/m$^2$; $\varepsilon_o$ is the permittivity of free space, (8.9×10$^{-12}$ C$^2$/N-m$^2$); d is the particle diameter, m; $\rho_s$ is the particle density, kg/m$^3$; U is the gas velocity, m/s. See Al-Adel et al., "The Effect of Static Electrification on Gas-Solid Flows in Vertical Risers," *Ind. Eng. Chem. Res.*, ASAP Article 10.1021/ie010982w S0888-5885(01)00982-4, Web Release Date: Mar. 7, 2002, incorporated herein by reference.

Additionally, for charged particles in field, the Poisson Equation must be satisfied where $\epsilon$ is the dielectric distribution of the gas-solid suspension.

$$\nabla \cdot (\epsilon \nabla \psi) = -\phi \qquad (2)$$

Upon combination of Equations (1) and (2), it is shown in Equation (3) that the particle distribution must also satisfy Poisson's Equation, which is a new and significant finding given that most investigators use empirical power law models to represent the volume fraction distribution of solids (see L. Godfroy, G. Patience, and J. Chaouki Radial Hydrodynamics in Risers Ind. Eng. Chem. Res. 1999, 28, 81–89, incorporated herein by reference).

$$\nabla \cdot \left( \frac{\varepsilon}{Q\phi} \nabla \phi \right) = \phi \qquad (3)$$

For purposes of this model, it is assumed that the charged particles possess the same sign, such as (−), or at least the particles behave as an ensemble of mixed charges having an equivalent net charge.

Figure 2:
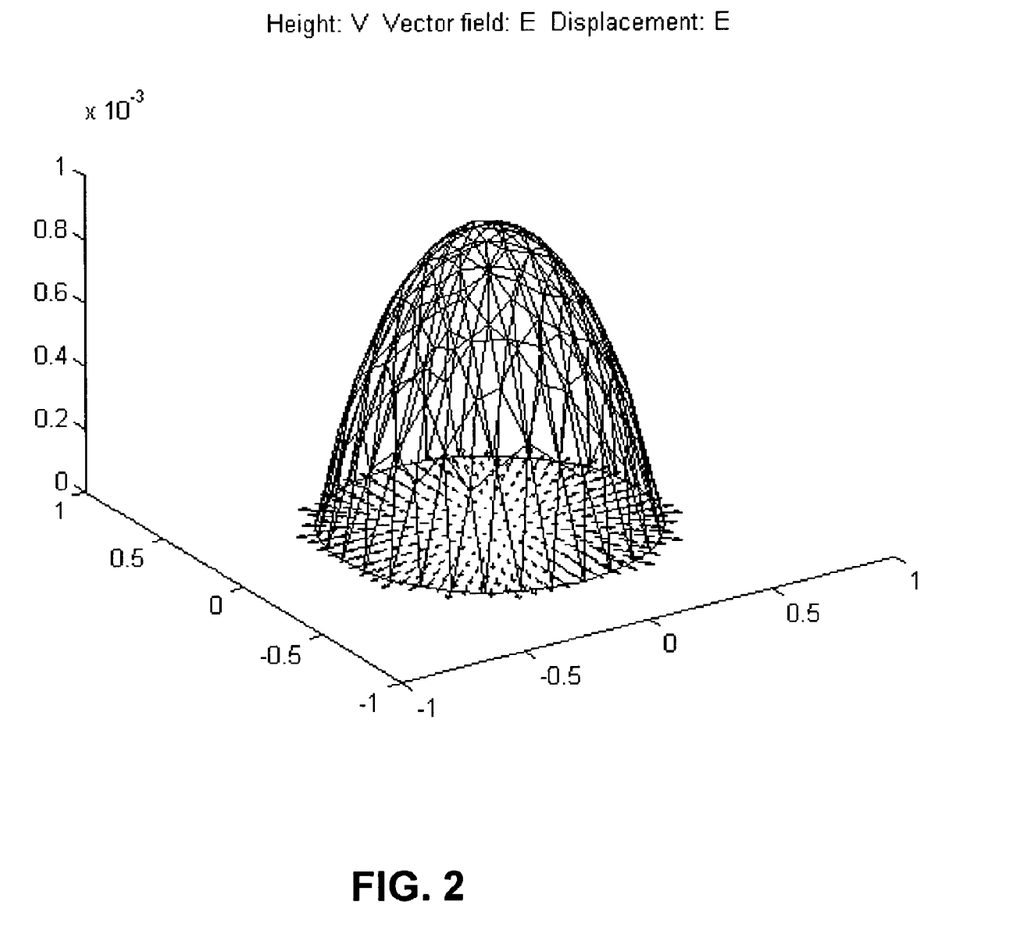
FIG. 2 is a graphical representation of an axisymmetric electric potential distribution using a conventional pipe configuration.

FIG. 2 illustrates an axisymmetric electric potential distribution in a conventional pipe resulting from a typical volume fraction distribution and a dielectric constant taken as $1+3.5\epsilon^{1.25}$. As used herein, axisymmetric means that the distribution is symmetrical about the axis coincident with flow. In this embodiment, the distribution is not dependent upon the azimuthal angle. The charged particles near the center have a higher potential than at the wall, and the particles move toward the lowest potential. According to Equation (1), the potential is used to construct the particle volume fraction.

In fluid-solid flow in pipes or ducts, particularly gas-solid flow in vertical pipes, the solid particles preferentially segregate themselves with most of the particles residing near the wall of the pipe and less at the center. Non-intrusive experimental techniques, like γ-ray tomography (Werther, "Measurement Techniques in Fluidized Beds," *Powder Tech.*, 102 (1999), 15–36) and electrical capacitance tomography ECT (Dyakowski et al., "Applications of Electrical Tomography for Gas-Solids and Liquid-Solids Flows—A Review," *Powder Tech.*, 112 (2000), 174–192), are methods suited to measure the radial distribution of particles. In the case of ECT, the method involves arranging electrodes (e.g., 8, 12, or more) equidistantly along the outer perimeter of the pipe wall and in the same plane perpendicular to the flow. One then measures the capacitance (a dielectric property) values between the electrodes by imposing an electric potential (referred to as 'firing') to a single electrode. Additional capacitance values are measured by firing the other electrodes one at a time. Capacitance values are calculated by integrating electric flux density, which also must satisfy an electric charge balance otherwise known as Poissson's equation. Reconstruction algorithms are used to convert the capacitance values to the dielectric distribution and then ultimately to a solids distribution.

The solid particle distribution in a riser can also be measured with a technique known as γ-ray densitometry. The principle behind this technique involves absorption of radiation emanating from a photon source by an absorbing body, where absorption is related to photon counts measured by a detector located a distance from the radiation source (the absorbing body lies in a line between the photon source and the detector). Measured photon counts are a function of the distance from the photon source and the bulk density of the absorbing body. This relation is expressed by the Beer-Lambert law, $$\frac{I_\lambda}{I_{\lambda o}} = e^{-\mu_\lambda \rho r},$$

where $I_\lambda$ is the total measured photon counts, r is the distance from the radiation source, ρ is the concentration of the absorbing body, $\mu_\lambda$ is a constant found through calibration, and and $I_{\lambda o}$ is the incident radiation at wavelength λ.

This principle is applied in γ-ray densitometry to measure the volume fraction of particles as a function of radius in a riser. A probe with a photon source (cd-109 isotope) is inserted radially into the riser, and photon counts are measured by a photomultiplier that is connected to the probe, but located external to the riser. The particle phase concentration, ρ, is then related to measured photon counts by the Beer-Lambert law. The probe is placed on a moving track that allows for the measurement of ρ at various radial locations in the riser. In this fashion particle concentration as a function of radial location in a riser may be determined. The volume fraction distribution is calculated by dividing the measured concentrations by the average concentration computed over the riser-generally in cylindrical coordinates. Often the average volume fraction is taken as ΔP/L.

Figure 3A:
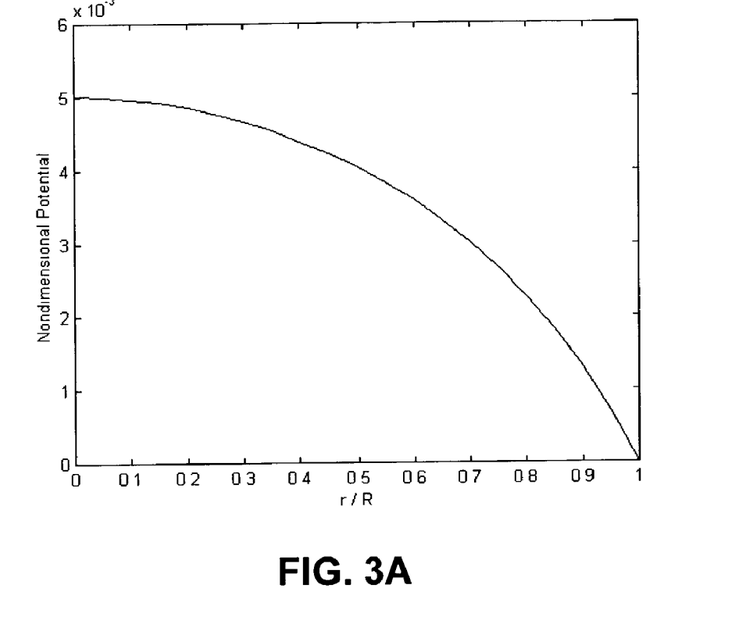
FIGS. 3A–B show electrical potential and particle volume fraction distributions, respectively, of solids flow through a conventional pipe configuration.
Figure 3B:
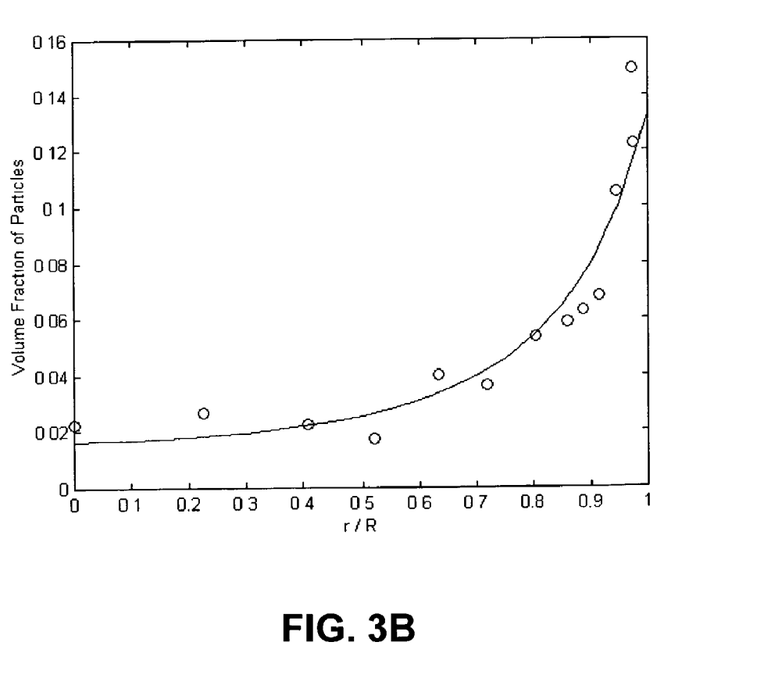

To illustrate, FIGS. 3A–B show the predicted distributions in a pipe resulting from Q=450 and an average volume fraction of ~4.5%. The volume fraction data shown as circles in FIG. 3B was collected using γ-ray densitometry for the following conditions: R=0.457 m (1.5 ft), d~75 μm, and $\rho_s$=1200 kg/m$^3$, U=22.5 (ft/s), $G_s$=40 lb/ft$^2$-s. The average solids volume fraction for the data is computed as $$\rho_{avg} = 2\int_0^1 \rho(\xi)\xi d\xi.$$

The value of Q=450 corresponds to the maximum in a bifurcation diagram. The data shown are typical for risers and illustrates the classical concept of the core-annuluar flow structure.

The premise supporting this invention is that the segregation of particles in fluid-solid flow in pipes, e.g. circulating bed riser reactors, is the result of a balance between a radial outwardly-directed, coulombic force, set up by charged particles, and an opposing pressure gradient due to the build up of particles near the wall. Equation (1) provides this explanation in mathematical terms. Equation (3), which satisfies charge conservation resulting from static electrification, is combined with Equation (1) to show that the solids distribution must also be a solution to Poisson's equation. The utility of this mathematical expression to predict experimental data is illustrated in FIG. 3B. The agreement between predicted distribution and the data supports the physics. Furthermore, the value of 450 for Q corresponds to a surface charge density on the order of 0.1 to 1 microcoulomb per square meter. This data suggests that electrification can explain the radial distribution of particles in gas-solid flow systems.

EXAMPLE 2

Figure 4A:
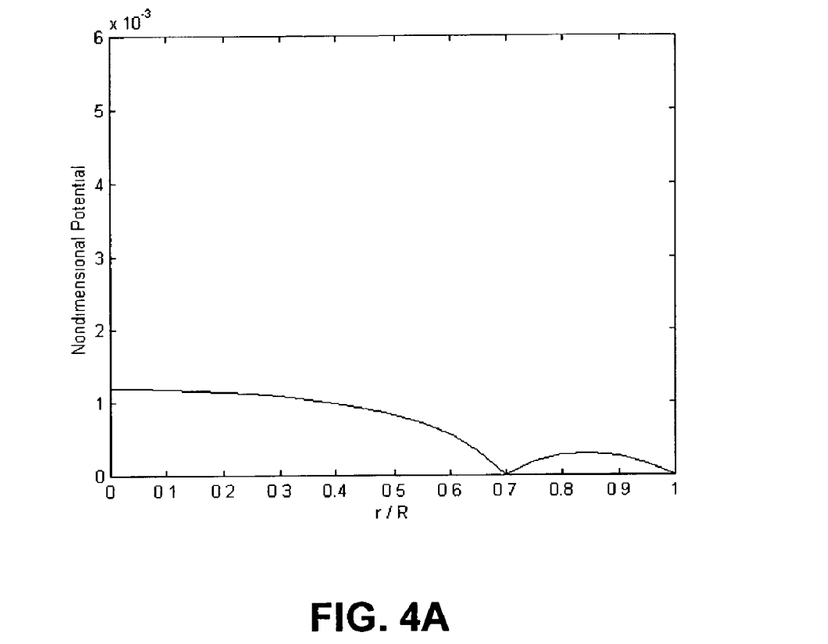
FIGS. 4A–B show electrical potential and particle volume fraction distributions, respectively, of solids flow through one type of pipe configuration of this invention.
Figure 4B:
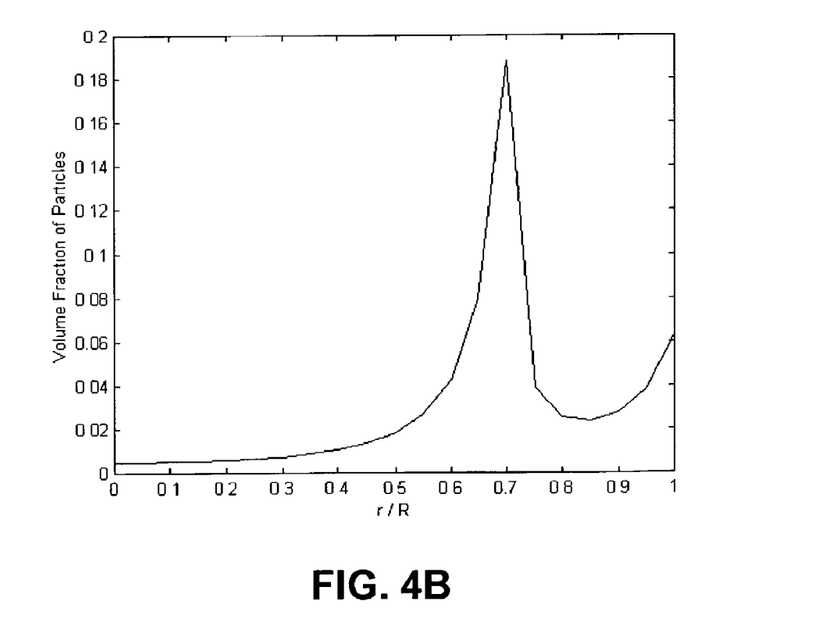

The benefits of this invention will be presented as they apply to gas-solid flow in gas-solids reactor systems such as circulating fluidized bed reactors. In this particular embodiment of the invention, a single inner conduit, similar to that shown in FIG. 1A, is located at a r/R=1/$\sqrt{2}$, a condition where the inner cross sectional area is equal to the annular cross sectional area. The potentials of the conduits are made to be equal (e.g., by connecting with grounding straps). Other parameters such as U, $G_s$, R, and $\rho_s$ remain the same as those in Example 1. Since U and $G_s$ are unchanged, a reasonable assumption is that the average volume fraction of particles must remain at 4.5%. The value of Q for this operating condition and set of boundary conditions was found to be 4000. FIGS. 4A–B illustrate the electric potential and particle volume fraction distributions, respectively, that result when an embodiment like that shown in FIG. 1A is employed. The maximum values of the electric potential in FIG. 4A are much less than those of the conventional system shown in FIG. 3A (Example 1).

EXAMPLE 3

Figure 5A:
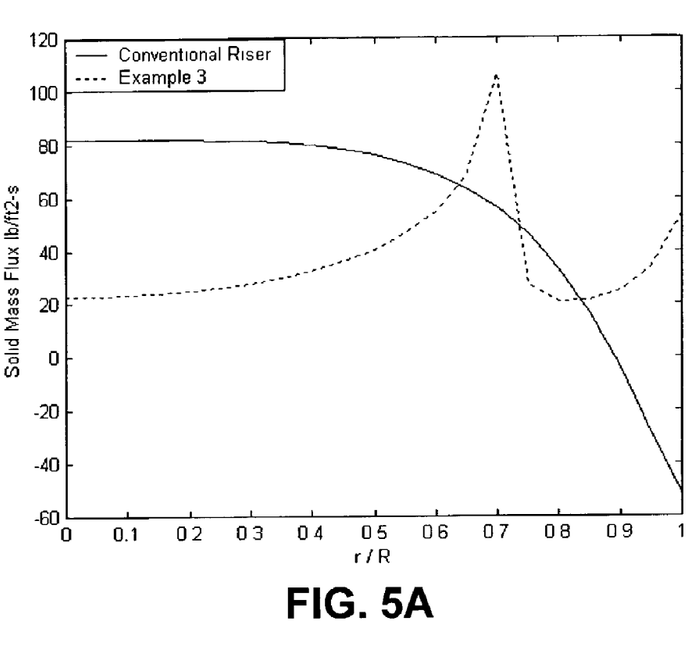
FIGS. 5A–B show the solid particle mass velocity distribution and the gas velocity profiles, respectively, in a conventional riser design and the system of this invention.
Figure 5B:
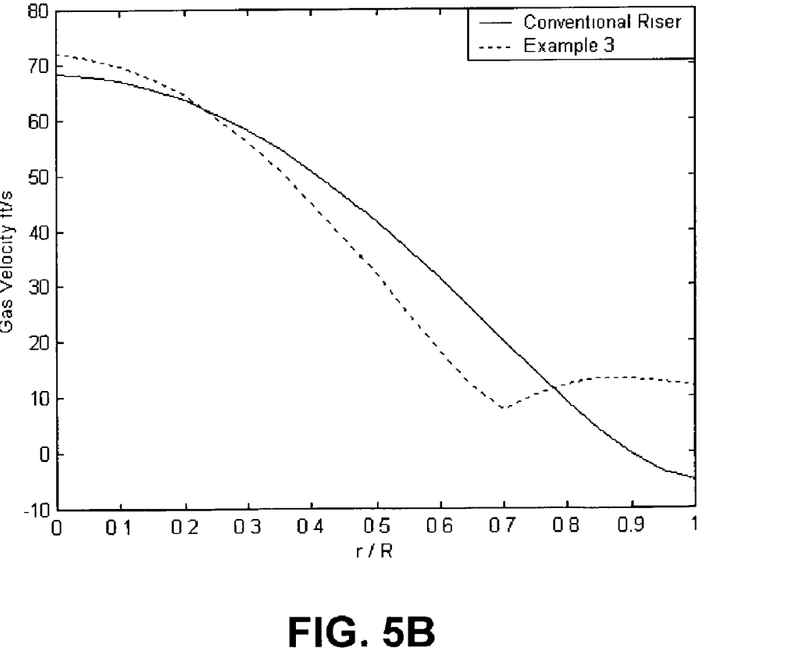

The corresponding velocity profiles from the conventional system and the invention are compared in FIGS. 5A and 5B. FIG. 5A shows the solids (particles) mass velocity distribution. The solid curve exhibits the classical shape observed in conventional risers and is characteristic of a core-annular flow structure. The flow in the center of the riser is directed upward and rapidly decreases near the wall. In fact, down flow of solids occurs at the wall and contributes to global circulation within the riser, an undesirable characteristic for plug flow. The dotted curve is the mass velocity profile representing one embodiment of the invention. Although the profile is not perfectly uniform, it is more so than that of the conventional system. Moreover, no down flow of solids occurs for the embodiment. FIG. 5B shows the gas velocity profiles. Again, the profile for the conventional system (solid line) is typical for risers. The shape is parabolic-like, possesses a steep radial gradient, and is negative near the wall. On the other hand, the profile representing an embodiment of the invention (dotted line) possesses a much reduced radial gradient, particularly near the wall, and does not become negative. Since the profile is less parabolic and the solids volume fraction is less segregated (FIG. 4B), the flow for the embodiment of the invention is more of an approach to plug flow than the conventional system.

EXAMPLE 4

Conduits are arranged as in Example 2. However, the conduits are not connected by grounding straps, and 73 KV are applied to the external conduit. This corresponds to a maximum electric potential of 10 KV/cm which is less than the break down strength of air (i.e., 30 KV/cm at STP).

Figure 6:
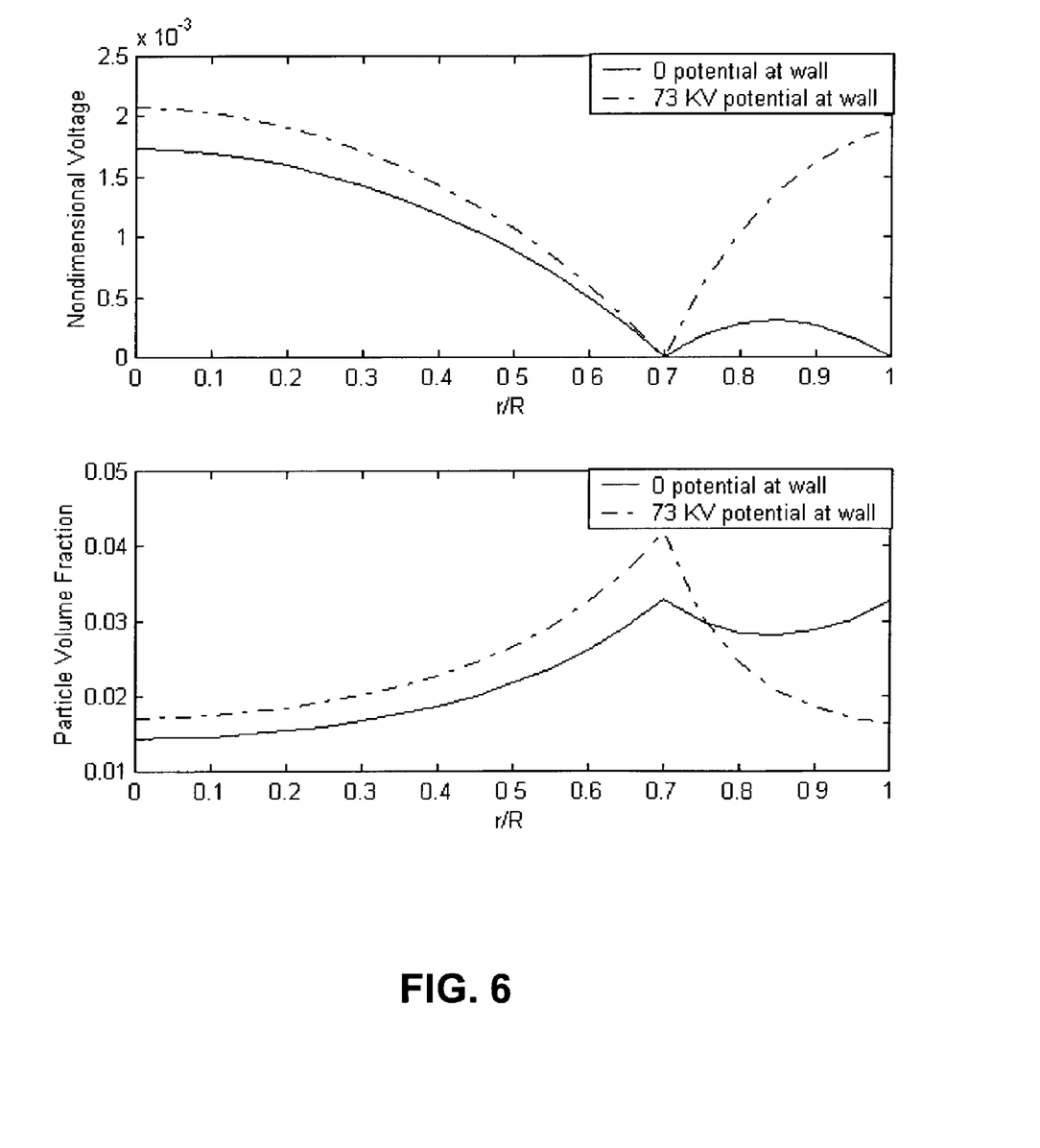
FIG. 6 shows the nondimensional voltage and particle volume fraction profiles, respectively, for one embodiment of the invention where a voltage is applied to the conductive surface of the reactor wall.
Figure 7:
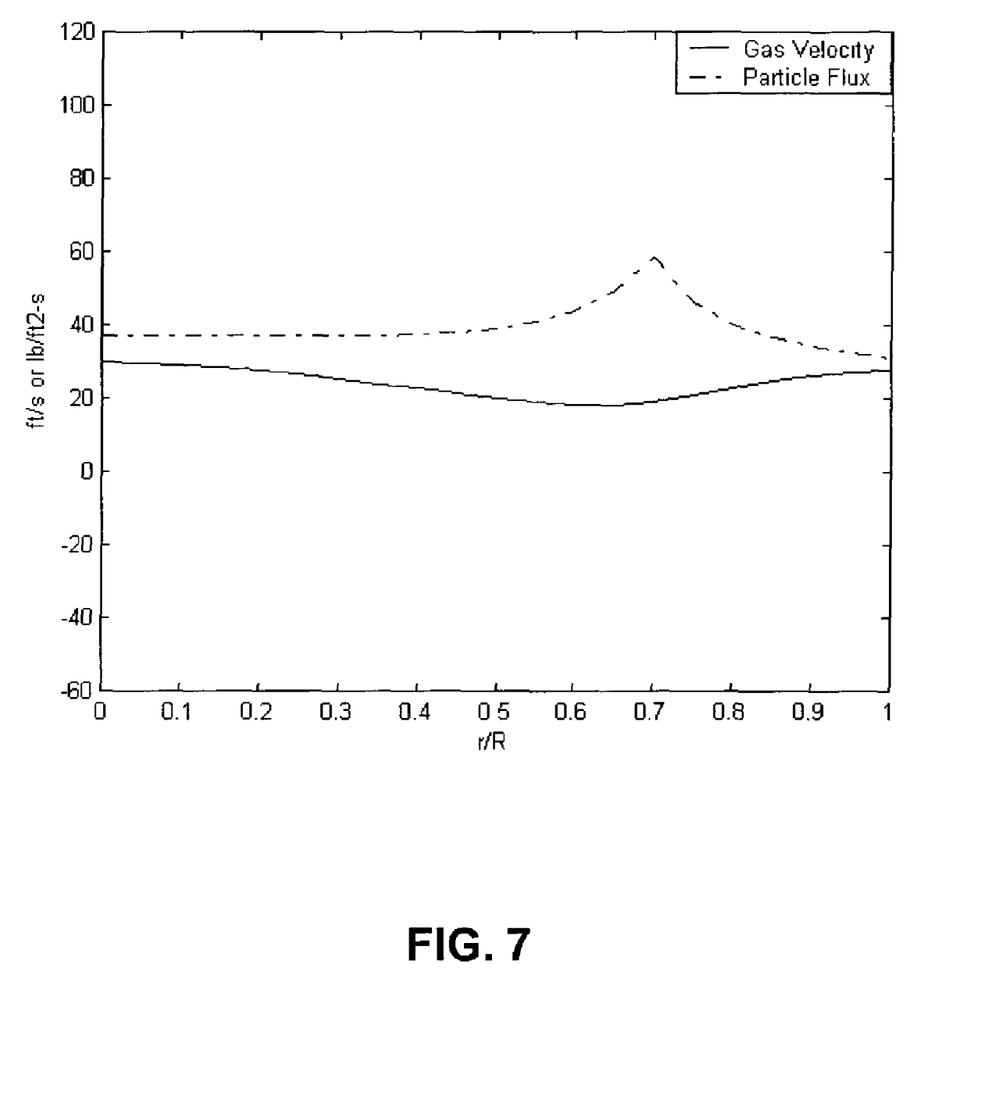
FIG. 7 shows the gas velocity and particle flux profiles for one embodiment of the invention where a voltage is applied to the conductive surface of the reactor wall.

Increasing the electric potential of the external conduit in this manner drives solids flowing in the annular region away from the external wall (i.e., toward the center of the annulus) to reduce particle hold up at the wall. FIG. 6 shows the voltage and particle volume fraction profiles for this embodiment, and FIG. 7 shows the gas velocity and particle flux profiles for this embodiment. In this embodiment, Q=450, $U_g$=22.5 ft/s, and $G_s$=40 lb/ft$^2$-s.

Having now fully described this invention, it will be appreciated by those skilled in the art that the invention can be performed within a wide range of parameters within what is claimed, without departing from the spirit and scope of the invention.

The invention claimed is:

1. A process for controlling plug flow characteristics of solid catalyst particles in a gas-solids reactor, the process comprising the steps of:
   a) flowing solid catalyst particles and gas between opposing conductive surfaces in a gas-solids reactor, wherein the solid catalyst particles are silicoaluminophosphate molecular sieve catalyst particles; and
   b) controlling electrical charges between the flowing solid catalyst particles and the opposing conductive surfaces in the gas-solids reactor to move the solid catalyst particles away from at least one of the opposing conductive surfaces, wherein the gas is an oxygenate and the oxygenate is flowed with the solid catalyst particles, the solid catalyst particles and gas are flowed at a weight hourly space velocity of 2 hr$^{-1}$ to 5000 hr$^{-1}$, and the solid catalyst particles and gas are flowed at a gas superficial velocity of at least 2 meters per second to achieve the plus flow characteristics in the gas-solids reactor.

2. The process of claim 1, wherein the oxygenate is methanol.

3. The process of claim 1, wherein the solid catalyst particles and gas are flowed at a catalyst to gas mass ratio of from 5:1 to 75:1.

4. A process for controlling plug flow characteristics of solid catalyst particles in a gas-solids reactor, the process comprising the steps of:
 a) providing a gas-solids reactor having a wall with an inner surface, at least a portion of the inner surface being made of conducting material;
 b) providing a conductive surface internal to the inner surface of the gas-solids reactor wall;
 c) flowing solid catalyst particles and a gas between the conducting material of the inner surface of the of the gas-solids reactor wall and the conductive surface internal to the inner surface of the gas-solids reactor wall, wherein the solid catalyst particles and the gas are flowed at a weight hourly space velocity of 2 hr$^{-1}$ to 5000 hr$^{-1}$ and the solid catalyst particles and the gas are flowed at a gas superficial velocity of at least 2 meters per second; and
 d) controlling electrical charges between the flowing catalyst, the conducting material of the inner surface of the of the gas-solids reactor wall, and the conductive surface internal to the inner surface of the gas-solids reactor wall to move the solid catalyst particles away from the conducting material of the inner surface of the of the gas-solids reactor wall or the conductive surface internal to the inner surface of the gas-solids reactor wall to achieve the plug flow characteristics in the gas-solids reactor.

5. The process of claim 4, wherein the electrical charges between the flowing catalyst, the conducting material of the inner surface of the of the gas-solids reactor wall, and the conductive surface internal to the inner surface of the gas-solids reactor wall are controlled by grounding the conducting material of the inner surface of the gas-solids reactor wall and the conductive surface internal to the inner surface of the gas-solids reactor wall to one another.

6. The process of claim 4, wherein the electrical charges between the flowing catalyst, the conducting material of the inner surface of the of the gas-solids reactor wall, and the conductive surface internal to the inner surface of the gas-solids reactor wall are controlled by applying a voltage to the conducting material of the inner surface of the gas-solids reactor wail or the conductive surface internal to the inner surface of the gas-solids reactor wall.

7. The process of claim 4, wherein the voltage applied is at least 10 KV.

8. The process of claim 7, wherein the voltage applied is at least 25 KV.

9. The process of claim 8, wherein the voltage applied is at least 50 KV.

10. The process of claim 4, wherein the gas is a chemical reactant.

11. The process of claim 10, wherein the chemical reactant is an oxygenate.

12. The process of claim 11, wherein the oxygenate is methanol.

13. The process of claim 4, wherein the solid catalyst particles are selected from the group consisting of molecular sieve catalyst particles, maleic anhydride forming catalyst particles, and acrylonitrile and methacrylonitrile forming catalyst particles.

14. The process of claim 13, wherein the solid catalyst particles are molecular sieve catalyst particles.

15. The process of claim 14, wherein the molecular sieve catalyst particles are silicoaluminophosphate molecular sieve catalyst particles.

16. The process of claim 4, wherein the solid catalyst particles and gas are flowed at a catalyst to gas mass ratio of from 5:1 to 75:1.

* * * * *